United States Patent
Combes et al.

(10) Patent No.: US 6,506,700 B1
(45) Date of Patent: *Jan. 14, 2003

(54) GLASS SHEETS INTENDED FOR THE PRODUCTION OF GLAZING PANES

(75) Inventors: Jean-Marie Combes, Paris (FR); Michel Lismonde, Courbevoie (FR)

(73) Assignee: Saint-Gobain Glass France, Courbevoie (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/737,342
(22) PCT Filed: Mar. 14, 1996
(86) PCT No.: PCT/FR96/00394
§ 371 (c)(1), (2), (4) Date: Feb. 27, 1997
(87) PCT Pub. No.: WO96/28394
PCT Pub. Date: Sep. 19, 1996

(30) Foreign Application Priority Data

Mar. 16, 1995 (FR) .............................. 95 03058

(51) Int. Cl.⁷ .......................... C03C 3/087; C03C 3/095
(52) U.S. Cl. .............................. 501/70; 501/64; 501/71; 428/34; 428/426
(58) Field of Search .............................. 501/64, 65, 66, 501/70, 71, 905; 428/426, 34

(56) References Cited

U.S. PATENT DOCUMENTS

| | | | | | |
|---|---|---|---|---|---|
| 4,792,536 | A | * | 12/1988 | Pecoraro et al. | 501/70 |
| 5,077,133 | A | * | 12/1991 | Cheng | 428/426 |
| 5,112,778 | A | * | 5/1992 | Cheng et al. | 501/31 |
| 5,214,008 | A | * | 5/1993 | Beckwith et al. | 501/69 |
| 5,264,400 | A | * | 11/1993 | Nakaguchi et al. | 501/71 |
| 5,385,872 | A | * | 1/1995 | Gulotta et al. | 501/71 |
| 5,411,922 | A | * | 5/1995 | Jones | 501/71 |
| 5,545,596 | A | * | 8/1996 | Casariego et al. | 501/71 |
| 5,656,559 | A | | 8/1997 | Combes et al. | 501/70 |
| 5,700,579 | A | * | 12/1997 | Jeanvoine et al. | 501/70 |

FOREIGN PATENT DOCUMENTS

| | | | |
|---|---|---|---|
| FR | 2682101 | * | 4/1993 |
| JP | 4-310539 | * | 11/1992 |
| JP | 8-034637 | * | 2/1996 |

* cited by examiner

Primary Examiner—Karl Group
(74) Attorney, Agent, or Firm—Oblon, Spivak, McClelland, Maier & Neustadt, P.C.

(57) ABSTRACT

This invention concerns glass sheets made from a glass containing, in percentages by weight, from 0.85 to 2% of total iron expressed in the form $Fe_2O_3$, the content by weight of FeO being from 0.21 to 0.40%, said sheets having, for a thickness of from 2 to 3 mm, a factor ($T_{LA}$) of at least 70%, a factor ($T_E$) less than 50% and a factor ($T_{UV}$) less than 25%. The sheets according to the invention are more especially intended for the production of lateral panes for automobile vehicles.

10 Claims, No Drawings

GLASS SHEETS INTENDED FOR THE PRODUCTION OF GLAZING PANES

This application is a 371 of PCT/FR96/00394, filed Mar. 14, 1996.

BACKGROUND OF THE INVENTION

This invention relates to glass sheets adapted for the production of glazing panes suitable for mounting in automobile vehicles and industrial vehicles and, more specifically, for serving as lateral window panes.

DISCUSSION OF THE BACKGROUND

The panes used in this latter type of application must satisfy the legal requirements relating to their light transmission. Thus, panes intended for the production of lateral windows must have a global light transmission factor under illuminant A ($TL_A$) of at least 70%.

The glazed area of automobile vehicles being at present very large and the demands of clients with regard to comfort becoming more and more exacting, the manufacturers of these vehicles are continually seeking every means that will make possible a reduction in the sensation of heat experienced by passengers subjected to the solar radiation. At the same time, however, the manufacturers of automobile vehicles are endeavouring to reduce as far as possible the weight of all the glass equipment.

For the purpose of maintaining a high light transmission in the visible part of the spectrum while absorbing the maximum possible proportion of the remainder of the solar energy, it is known to introduce iron into the composition of the glass used for the production of the sheets. The iron is present in the glass both in the form of ferric oxide ($Fe_2O_3$) and ferrous oxide (FeO). The presence of $Fe_2O_3$ makes possible the absorption of the UV radiation and that which has the shortest wavelengths in the visible part of the spectrum; on the other hand, the presence of FeO makes possible the absorption of the radiation of the near infrared and that corresponding to the long wavelengths of the visible range. If the increase of the iron content, in both forms of oxide, accentuates the absorption of the radiation at the two extremities of the visible spectrum, this effect is achieved to the detriment of the transmission of light.

At present, various solutions have been proposed for utilizing to the optimum the capacity of the iron oxides for absorbing radiation while nevertheless conserving the greatest possible transmission of light.

Thus, patent EP-B-297 404 describes and claims silico-sodo-calcic glasses in which the total iron content, expressed in the form of $Fe_2O_3$, lies between 0.45 and 0.65%. These glasses are manufactured in conditions such that at least 35%, and preferably at least 50%, of total iron is in the form of FeO. The increase in the FeO content thus obtained enables the absorption of the glasses in the infrared to be accentuated and the global energy transmission factor ($T_E$) to be reduced. However, when a glass is manufactured in the presence of sulphur in highly reducing conditions, it will have an amber colour due to the formation of chromophores which result from the reaction between the sulphur and the ferric iron. In order to avoid this, it is therefore necessary to eliminate the sulphates from the vitrifiable mixture and, since the sulphur content in a glass is never zero, to ensure that the percentage of ferric iron remains low, which implies rigorously limiting the total iron content. It follows that the capacity of these glasses for absorbing UV radiation is mediocre.

It is also known to produce glasses which, as a result of a higher total iron content than that specified by the above-mentioned European patent, combine a good transmission of light and a good absorption of the infra-red and ultraviolet radiation.

Thus, patent U.S. Pat No. 5,214,008 describes glasses devoid of ceric oxide and other oxides of that type, which contain from 0.7 to 0.95% by weight total iron expressed in the form $Fe_2O_3$. These glasses are produced in conventional furnaces from ordinary vitrifiable raw materials. The degree of oxidoreduction of the glass is controlled by the introduction of carbon and sodium sulphate into the vitrifiable mixture.

This oxidoreduction degree varies within precise limits such that the iron in the form of FeO in the glass varies from 0.19 to 0.24% by weight, said glass having, for a thickness of from 3.7 to 4.8 millimetres, a light transmission factor higher than 70%, a transmission in the ultraviolet of less than 38% and a global energy transmission factor of less than 44.5%.

Other silico-sodo-calcic glass compositions make possible the obtaining, for a given thickness, of a light transmission factor of at least 70% and a good absorption of the infrared and ultraviolet radiations. This is the case, notably, of those described in patent applications EP-A-488 110 and WO-91/07356. In addition to the oxides of iron, the glasses specified in these patent applications contain ceric oxide and titanium oxide.

SUMMARY OF THE INVENTION

The present invention has as its subject a glass sheet formed from a glass capable of being spread over the surface of a bath of molten metal, the transmission characteristics of which are principally controlled by the presence of iron oxides and which have, in comparison with glass sheets possessing a comparable overall light transmission factor, a capacity for absorption of the infrared and ultraviolet radiations at least equivalent to that of said glasses but with a smaller thickness.

The present invention also has as its subject glass sheets making possible the production of lateral glazing panes for automobile vehicles, the thickness of which is smaller than the thickness of the known lateral panes, but which nevertheless have comparable transmission characteristics.

The objective of the invention is achieved by a glass sheet formed of a silico-sodo-calcic glass which contains, expressed in percentages by weight, from 0.85 to 2% total iron expressed in the form of $Fe_2O_3$, the content by weight of ferrous iron in the form FeO being from 0.21 to 0.40%, said glass having, for a thickness of from 2 to 3 mm, a global light transmission factor under illuminant A ($TL_A$) of at least 70%, a global energy transmission factor ($T_E$) of less than approximately 50% and a transmission factor of ultraviolet radiation less than approximately 25%. The light transmission and energy transmission values have been determined by the Parry Moon Mass 2 method; the transmission in the ultraviolet was determined by the method defined in standard ISO 9050.

DETAILED DESCRIPTION OF THE PREFERRED EMBODIMENTS

The glasses used for the production of the glass sheets according to this invention are manufactured from common raw materials, to which cullet may be added in conventional furnaces used in float glass technology. The melting and refining of these glasses takes place in flame furnaces provided, if desired, with electrodes for assuring the heating of the glass in the mass by passage of an electric current between said electrodes. The oxidoreduction degree of the glasses is controlled by oxidizing agents, such as sodium sulphate, and reducing agents, such as coke. The quantity of sodium sulphate introduced into the vitrifiable mixture, taking into account the characteristics of the furnace in which this mixture is melted, is such that the $SO_3$ content in the glass is generally from 0.08 to 0.35%. The content of reducing agents associated with the sulphate, taking account also of the characteristics of the production furnace for the glass, is calculated in such a way that the oxidoreduction degree of said glass shall be maintained within precise limits. These limits are defined by the extreme values of the ratio between the quantity of ferrous iron expressed in the form FeO and the quantity of total iron expressed in the form $Fe_2O_3$. According to the invention, this ratio $FeO/Fe_2O_3$ varies from 20 to 34%.

The glasses used for the production of the glass sheet according to the invention may contain, in addition, up to approximately 0.04% of one or more of the following constituents: CoO, $Cr_2O_3$, Se, $TiO_2$, MnO, NiO, CuO. These constituents may originate from impurities contained in certain of the vitrifiable raw materials used and/or from the glass cullet mixed with the vitrifiable materials; they may also be added deliberately to the vitrifiable mixture in order to give, for example, a particular tint.

The glasses used for the production of the glass sheets according to the invention are silico-sodo-calcic glasses, which contain the constituents listed below in the contents defined by the following limits, expressed in percentages by weight:

| | |
|---|---|
| $SiO_2$ | 64 to 75% |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ (total iron expressed in this form) | 0.85 to 2% |
| FeO | 0.21 to 0.40% |
| CoO, $Cr_2O_3$, Se, $TiO_2$, MnO, NiO, CuO | 0 to 0.04% |
| $SO_3$ | 0.08 to 0.35% |

In addition to the transmission characteristics mentioned earlier, the glasses used for the production of the glass sheets according to this invention generally have a tint tending towards the blue-green. Their dominant wavelength under illuminant C is generally from 490 to 510 nanometres.

Within the framework of this invention, the glass sheets are preferably manufactured from a silico-sodo-calcic glass which contains, expressed in percentages by weight, from 0.95 to 2% total iron expressed in the form $Fe_2O_3$, the content by weight of ferrous iron in the form FeO being from 0.29 to 0.40%. The sheets made from such a glass have, for a thickness of less than 3 mm and greater than 2 mm, a global energy transmission factor ($T_E$) less than approximately 46%.

In this form of embodiment, the glass used for the production of a glass sheet according to this invention preferably has a content of FeO which represents from 25 to 30% of the total iron content expressed in the form $Fe_2O_3$.

In another form of embodiment, the glass sheets according to the invention are preferably manufactured from a glass which contains the constituents listed below, in the contents defined by the following limits, expressed in percentages by weight:

| | |
|---|---|
| $SiO_2$ | 68 to 75% |
| $Al_2O_3$ | 0 to 3% |
| $B_2O_3$ | 0 to 5% |
| CaO | 2 to 10% |
| MgO | 0 to 2% |
| $Na_2O$ | 9 to 18% |
| $K_2O$ | 0 to 8% |
| $Fe_2O_3$ (total iron expressed in this form) | 0.95 to 2% |
| CoO, $Cr_2O_3$, Se, $TiO_2$, MnO, NiO, CuO | 0 to 0.04% |
| FeO | 0.29 to 0.40% |
| $SO_3$ | 0.08 to 0.35% |

The sheets, made from a thus defined glass, have, for a thickness of less than 3 mm and greater than 2 mm, a global energy transmission factor ($T_E$) less than approximately 46%.

In this latter form of emobodiment, the glass used for manufacturing a glass sheet according to the invention preferably has a content of FeO which represents from 20 to 32% of the total iron content expressed in the form $Fe_2O_3$.

Generally speaking, the glass used for manufacturing a glass sheet according to this invention may contain up to 1.5% by weight of $CeO_2$, which favours the absorption of the ultraviolet radiation.

In order to obtain a better appreciation of the advantages of the present invention, examples of glass used for manufacturing glass sheets according to the invention are given in the annexed table.

These glasses may be converted into continuous ribbon by using the float glass technique. The glass sheets according to the invention are obtained by cutting from a ribbon which has thicknesses ranging from 1 to 3 millimetres. These glass sheets can be used alone or in association for the construction of panes intended to be mounted on automobile vehicles.

For producing lateral panes, it is possible to use a single sheet of toughened glass having a thickness of less than 3 millimetres. At such a thickness, the glass sheets according to the invention assure good absorption of the ultraviolet radiation and good thermal comfort and enable a not inconsiderable lightening of the glass equipment of the vehicle to be achieved. It is also possible to produce a laminate comprising, for example, two sheets approximately 1 mm thick separated by an intermediate sheet of an organic material such as, for example, a sheet of polyvinyl butyral (PVB).

Like other glazing panes, the panes produced from the glasses according to this invention may be subjected in advance to surface treatments.

| | Thickness: 2.6 mm | | Thickness: 2.3 mm | |
|---|---|---|---|---|
| | no. 1 | no. 2 | no. 3 | no. 4 |
| $SiO_2$ | 71.2% | 73.2% | 71.2% | 72.9% |
| $Al_2O_3$ | 0.6% | 0.95% | 0.6% | 0.85% |
| CaO | 8.5% | 8.6% | 8.4% | 8.6% |
| MgO | 3.8% | 0.35% | 3.7% | 0.25% |
| $Na_2O$ | 14.2% | 15.3% | 14.2% | 15.1% |
| $K_2O$ | 0.185% | 0.5% | 0.225% | 0.5% |
| $Fe_2O_3$ (tot.) | 1.215% | 1.28% | 1.375% | 1.50% |

-continued

|  | Thickness: 2.6 mm | | Thickness: 2.3 mm | |
| --- | --- | --- | --- | --- |
|  | no. 1 | no. 2 | no. 3 | no. 4 |
| FeO | 0.34% | 0.34% | 0.385% | 0.39% |
| $SO_3$ | 0.3% | 0.3% | 0.3% | 0.3% |
| Redox | 0.28 | 0.265 | 0.28 | 0.26 |
| $T_{LA}$ (%) | 71% | 71% | 71% | 71% |
| $T_E$ (%) | 43.7% | 41.8% | 43.8% | 42.0% |
| $T_{UV}$ (%) | 18.8% | 19.9% | 18.6% | 19.6% |

What is claimed is:

1. Glass sheet formed of a silico-sodo-calcic glass having, for a thickness of from 2 to 3 mm, a global light transmission factor under illuminant A ($T_{LA}$) of at least 70%, a global energy transmission factor ($T_E$) less than approximately 50% and a transmission factor for ultraviolet radiation less than approximately 25%, wherein said glass comprises, expressed in percentages by weight:

| $SiO_2$ | 64 to 75% |
| --- | --- |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ (total iron expressed in this form) | 1.215 to 2% |
| CoO, $Cr_2O_3$, Se, $TiO_2$, MnO, NiO, CuO | 0% |
| FeO | 0.21 to 0.40% |
| $SO_3$ | 0.08 to 0.35%. |

2. Glass sheet according to claim 1, wherein the content of ferrous iron in the form FeO represents from 20 to 34% of the total iron content expressed in the form $Fe_2O_3$.

3. Glass sheet according to claim 1, wherein said glass comprises, expressed in percentages by weight:

| $SiO_2$ | 64 to 75% |
| --- | --- |
| $Al_2O_3$ | 0 to 5% |
| $B_2O_3$ | 0 to 5% |
| CaO | 2 to 15% |
| MgO | 0 to 5% |
| $Na_2O$ | 9 to 18% |
| $K_2O$ | 0 to 5% |
| $Fe_2O_3$ (total iron expressed in this form) | 1.215 to 2% |
| CoO, $Cr_2O_3$, Se, $TiO_2$, MnO, NiO, CuO | 0% |
| FeO | 0.29 to 0.40% |
| $SO_3$ | 0.08 to 0.35%. |

4. Glass sheet according to claim 3, wherein the content of ferrous iron in the form FeO represents from 25 to 30% of the total iron content expressed in the form $Fe_2O_3$.

5. Glass sheet according to claim 1, wherein said glass comprises, expressed in percentages by weight:

| $SiO_2$ | 68 to 75% |
| --- | --- |
| $Al_2O_3$ | 0 to 3% |
| $B_2O_3$ | 0 to 5% |
| CaO | 2 to 10% |
| MgO | 0 to 2% |
| $Na_2O$ | 9 to 18% |
| $K_2O$ | 0 to 8% |
| $Fe_2O_3$ (total iron expressed in this form) | 1.215 to 2% |
| CoO, $Cr_2O_3$, Se, $TiO_2$, MnO, NiO, CuO | 0% |
| FeO | 0.29 to 0.40% |
| $SO_3$ | 0.08 to 0.35% | said glass having, for a thickness of less than 3 mm and greater than 2 mm, a global energy transmission factor ($T_E$) less than approximately 46%.

6. Glass sheet according to claim 5, wherein the content of ferrous iron in the form FeO represents from 20 to 32% of the total iron content expressed in the form $Fe_2O_3$.

7. Glass sheet according to claim 1, wherein the glass contains up to 1.5% by weight of $CeO_2$.

8. Glazing pane comprising at least one glass sheet having a thickness of from 1 to 3 mm, which is made from a glass, the chemical composition of which is defined by claim 1.

9. Glazing pane comprising two glass sheets made from a glass, the chemical composition of which is defined by claim 1, separated by an intermediate sheet of an organic material.

10. Glass sheet according to claim 1, having a blue-green tint, and a dominant wavelength under illuminant C of from about 490 to 510 nm.

* * * * *